United States Patent Office.

SYDNEY C. LONG AND F. SCHUMACHER, OF BALTIMORE, MARYLAND, AND JACKSON WARNER, OF CINCINNATI, OHIO, ASSIGNEES, BY MESNE ASSIGNMENTS, OF B. A. LAVENDER AND KATE LOWE, ADMINISTRATRIX OF ESTATE OF H. LOWE, DECEASED.

*Letters Patent No.* 10,722, *dated April* 4, 1854; *extended seven years; reissue No.* 2,983, *dated June* 9, 1868

IMPROVEMENT IN OBTAINING CANE-FIBRE FROM CANE.

The Schedule referred to in these Letters Patent and making part of the same.

TO ALL WHOM IT MAY CONCERN:

Be it known that BENJAMIN A. LAVENDER and HENRY LOWE, late of Baltimore city, and State of Maryland, invented what may be termed an Improved Method of Making Hemp or Cane-Cotton, and invented a new article of commerce and manufacture, which is useful for cordage, rope, bagging, matting, also in the manufacture of paper and other textile fabrics. It also serves as a most excellent substitute for other fibre in the various branches of art, where hemp, cotton, or their equivalents are now generally used; and we do hereby declare that the following is a full, clear, and exact description of the same.

The nature of our invention consists simply in obtaining the fibre from the ordinary reed or cane common to the Carolinas and other southern States, and by botanists known as the *Arundinaria macrosperma* of Michaux.

It will readily occur to any one skilled in the arts to which this invention applies, that the reed or cane may be crushed or broken in various ways, and by different kinds of machinery. This all, however, interferes not in the slightest degree with the broad principle of the invention, which is the obtaining, for the various purposes mentioned, the fibre of the cane or reed to be used like hemp or cotton.

One of the methods by which a fine and bleached article can be obtained is as follows:

The reed or cane is first passed through rollers, so as to crush them flat, and cut into convenient lengths, of three or four feet, and then laid compactly in a suitable vessel. We prefer a tub or vat of yellow-pine plank, because it is a wood not easily affected by acid.

Muriatic or sulphuric acid, of a strength of about eighteen (18°) degrees Baumé, diluted with an equal quantity in weight of water, is then poured upon the cane, enough to cover it. Suffer the cane to remain in this position until fully disintegrated, which is ascertained, on trial, by the fibres easily separating and being very tender. The time required for maceration is two or three days. Then draw the acid off for future use. Then add cream of lime or any carbonated or caustic alkali, in quantity sufficient to neutralize the acid absorbed by the cane, with water sufficient to cover it, and let it remain in this alkaline solution ten or twelve hours. Let the solution then be drawn off, and take the cane out carefully, as it is tender, and dry it in the most convenient mode. Then thoroughly dry the fibres; though they separate from each other easily, yet they retain their original strength and tenacity. Pass the cane then through a break similar to that use for breaking flax and hemp, and cleanse it, and it becomes fit for use, and should be put up with the fibres laid out straight and regular, as Kentucky hemp is prepared for market, unless it is put up expressly for paper-making, in which case it is unnecessary to use such care in putting it up straight.

The invention is not limited to the process described, as other equivalent means may be used for separating this hemp of the cane, or for obtaining the cane-cotton.

Having thus fully described our invention, what we claim therein as new, and desire to secure by Letters Patent of the United States, is—

1. Obtaining the fibre from the cane or reed, *Arundinaria macrosperma* of Michaux, for the purpose specified.
2. We claim cane-cotton, or hemp, as a new article of commerce and manufacture, for the purpose specified.
3. Breaking down woody fibre of cane and other like plants, and dissolving the gummy and other foreign matters therefrom, by means of muriatic or sulphuric acid, of the strength of 10° Baumé, or thereabout, preparatory to making hemp or cotton for bagging, rope, paper-pulp, &c., in the manner substantially as set forth.

In testimony whereof, we have signed our names to this specification in the presence of two subscribing witnesses.

SYDNEY C. LONG,
F. SCHUMACHER,
J. WARNER.

Witnesses:
W. H. BAYJAUD,
H. R. SADLER.